United States Patent
Takada et al.

(10) Patent No.: US 7,434,748 B2
(45) Date of Patent: Oct. 14, 2008

(54) VEHICLE LAMP WASHING DEVICE

(75) Inventors: Hiromasa Takada, Shizuoka (JP); Masato Hagiwara, Shizuoka (JP)

(73) Assignee: Koito Manufacturing Co. Ltd., Minato-ku, Tokyo (JP)

( * ) Notice: Subject to any disclaimer, the term of this patent is extended or adjusted under 35 U.S.C. 154(b) by 455 days.

(21) Appl. No.: 11/001,814

(22) Filed: Dec. 2, 2004

(65) Prior Publication Data

US 2005/0121539 A1 Jun. 9, 2005

(30) Foreign Application Priority Data

| Dec. 5, 2003 | (JP) | ............... P. 2003-407051 |
| Dec. 19, 2003 | (JP) | ............... P. 2003-422222 |
| Dec. 19, 2003 | (JP) | ............... P. 2003-422223 |

(51) Int. Cl.
*B05B 1/10* (2006.01)

(52) U.S. Cl. ............... 239/284.2; 239/587.1; 239/587.2; 15/250.01; 15/250.002

(58) Field of Classification Search ............... 239/284.1, 239/284.2, 587.1, 587.2; 15/250.01, 250.002, 15/250.02

See application file for complete search history.

(56) References Cited

U.S. PATENT DOCUMENTS

| 5,242,114 A | * | 9/1993 | Camier et al. ............ 239/284.2 |
| 5,269,464 A | * | 12/1993 | Epple et al. ............ 239/284.2 |
| 6,234,410 B1 | * | 5/2001 | Martin et al. ............ 239/284.2 |
| 6,520,659 B2 | * | 2/2003 | Nishiyama et al. ........ 239/284.2 |
| 6,905,078 B1 | * | 6/2005 | Gattuso et al. ........... 239/284.2 |
| 2003/0116645 A1 | * | 6/2003 | Hirose et al. ............ 239/284.2 |

FOREIGN PATENT DOCUMENTS

| DE | 198 11 827 | 10/1998 |
| DE | 100 20 044 | 11/2001 |
| EP | 1 099 610 | 5/2001 |
| GB | 1559533 | 1/1980 |
| GB | 2 323 271 A | 9/1998 |
| JP | 63-196766 | 12/1963 |
| JP | 63-065966 | 3/1988 |
| JP | 10-258712 | 9/1998 |
| JP | 2001-233182 | 8/2001 |
| JP | 2002-178886 | 2/2002 |

OTHER PUBLICATIONS

German official action dated Jul 8, 2007, in counterpart application (and English translation).
Office Action dated Mar. 18, 2008, in German counterpart application, and English translation.

* cited by examiner

*Primary Examiner*—Steven J Ganey
(74) *Attorney, Agent, or Firm*—Fish & Richardson P.C.

(57) ABSTRACT

There are disposed a spray nozzle 12 which includes a supported section 13 and a spray section 14 for spraying cleaning water; a nozzle holder 9 into which the supported section 13 of the spray nozzle 12 is inserted and which supports the spray nozzle 12 so as to allow rotation only about an axis extending in the direction in which the spray nozzle 12 is inserted into the nozzle holder 9; and a water-supply unit 5 which has a fluid passage for supplying cleaning water to the spray nozzle 12 and to which the nozzle holder 9 is connected.

9 Claims, 14 Drawing Sheets

VEHICLE LAMP WASHING DEVICE

This application claims foreign priorities based on Japanese Patent applications No. 2003-407051 filed on Dec. 5, 2003, Nos. 2003-422222 and 2003-422223, both filed on Dec. 19, 2003, the contents of which are incorporated herein by reference in their entirety.

BACKGROUND OF THE INVENTION

1. Field of the Invention

The present invention relates to a vehicle lamp washing device, more specifically, it relates to a vehicle lamp washing device which enables adjustment of spraying direction of cleaning water sprayed from a spray nozzle, and realizes a small size and reduction of manufacturing cost thereof with securing a good rectification function. Further realized is a low profile of the device by means of endowing a spray nozzle with a function of changing a flow direction of cleaning water.

2. Description of the Related Art

A washing device for washing a vehicle lamp; for instance, a surface of a vehicle headlamp, or the like, has been put into practical use.

Such washing devices include a type having a spray nozzle for spraying cleaning water, and a nozzle holder for holding the spray nozzle, wherein the spray nozzle is fixed in the nozzle holder such as shown in JP-A-63-65966.

In a washing device of such a type wherein the spray nozzle is fixed in the nozzle holder, the spraying direction of cleaning water from the spray nozzle cannot be adjusted, and the spraying direction is always limited to a predetermined direction. In the case where the spraying direction cannot be adjusted, there arises a problem that, for instance, washing devices corresponding to vehicle model changes cannot be installed, thereby showing lack of versatility.

On the other hand, there has been developed a washing device of another type, wherein at least one portion of the spray nozzle is formed into a supported section of a substantially spherical shape so as to be supported by the nozzle holder, and the spraying direction from the spray nozzle can be adjusted by means of rotating the spray nozzle in a desired direction in relation to the nozzle holder such as shown in JP-A-10-258712.

However, in the case of a conventional washing device disclosed in JP-A-10-258712, when the spraying direction is configured to be adjustable by means of rotating the spray nozzle in a desired direction, there must be provided a space for preventing contact between a lower end section of the spray nozzle and the inner surface of the nozzle holder in the case where the spray nozzle is rotated in a direction tilted toward the nozzle holder. More specifically, a relief space must be formed for preventing contact between the lower end section of the spray nozzle and the inner surface of the nozzle holder at a joint between a nozzle-holding section 121 and a connecting pipe section 122 of JP-A-10-258712.

However, the above configuration might cause a problem such that the nozzle holder is lengthened (increased in height) by an amount corresponding to the relief space, thereby inhibiting miniaturization and profile reduction of the washing device.

In addition, some vehicles, depending on the size and/or shape of a vehicle lamp to be washed, vehicle model, or the like, need adjustment of spraying direction of the vehicle lamp washing device; however, some vehicles do not need adjustment of the spraying direction to a desired direction. In such a case, a function enabling adjustment of the spraying direction to a desired direction can be excessive.

Further, in some other washing devices, a collar is disposed inside a spray nozzle for the purpose of rectification of cleaning water supplied to the spray nozzle and atomization of the same sprayed from a spray orifice.

However, when a collar as a separate component from the spray nozzle is disposed inside the spray nozzle, the number of components of the washing device is increased, and an additional assembly process for disposing the collar is needed for it, which ends up raising a problem of increasing manufacturing cost of the washing device. Particularly, a washing device of such a type disclosed in Patent Document 1 has a spray nozzle being held in a nozzle holder, where a collar might be required in addition to the spray nozzle and the nozzle holder so that the device needs three components.

Furthermore, when a collar, which is a component separated from a spray nozzle, is disposed, a space for mounting the collar is required. Accordingly, size of the washing device might become large.

Turning to JP-A-2001-233182, it discloses a washing device including a spray nozzle for spraying cleaning water, and a nozzle holder for holding the spray nozzle such as shown in FIG. 15.

The washing device "a" includes a cylinder "b," and a piston "c" supported by the cylinder "b" so as to be longitudinally slidable. A nozzle holder "d" is connected to the front end of the piston "c."

A spray nozzle "e" formed into a substantially spherical shape is held in the nozzle holder "d" such that the spray nozzle "e" is allowed to rotate in a desired direction in relation to the nozzle holder "d." Therefore, the spray direction of cleaning water sprayed from the spray nozzle "e" can be adjusted by means of rotating the spray nozzle "e" in relation to the nozzle holder "d."

The cylinder "b" is held by a vehicle headlamp "f" via holding members "g," "g." A lens member "h" disposed under the vehicle headlamp "f" is attached to the nozzle holder "d."

The washing device "a" is housed inside a vehicle body when the vehicle headlamp "f" is not being washed (a state indicated with solid lines in FIG. 15); and when the washing device "a" is in use, the lens member "h," the nozzle holder "d," and the spray nozzle "e" integrally protrude outside the vehicle body by means of the piston "c" protruding forward from the cylinder "b" (a state indicated with dotted lines in FIG. 15).

When the spray nozzle "e" protrudes outside the vehicle body, cleaning water is supplied from an unillustrated cleaning water tank to the spray nozzle "e" by way of the cylinder "b" and the nozzle holder "d," and the cleaning water is sprayed from the spray nozzle "e" toward a surface of a lens (a lens cover) of the vehicle headlamp "f."

Meanwhile, in the above-mentioned conventional washing device, for allowing the spray nozzle "e" rotating in relation to the nozzle holder "d," a relief space "i", which prevents the lower end of the spray nozzle "e" from coming in contact with an inner surface of the nozzle holder "d" when the spray nozzle "e" rotates, is formed inside the nozzle holder "d." Accordingly, the cleaning water supplied from the cylinder "b" to the nozzle holder "d" is changed to a direction substantially perpendicular to a direction of a flow effected when the water is supplied from the space "i" to the spray nozzle "e," and the direction of flow of water is further changed immediately before the water is spray from the spray nozzle "e," whereupon the cleaning water is sprayed toward the lens surface of the vehicle headlamp "f."

However, this type of conventional washing device "a" involves a problem that the nozzle holder is increased in height by an amount required for forming the relief space "i"

as described above, and this becomes an obstacle for miniaturization and reduction in profile of the washing device "a."

Particularly, in many cases, reduction of the height of the washing device "a" is required from a constraint in view of design of appearance of the vehicle headlamp "f."

SUMMARY OF THE INVENTION

In order to so provide, it is one of objects for this invention is to provide a vehicle lamp washing device which solves the above mentioned problems, and enables adjustment of the spraying direction of cleaning water sprayed from a spray nozzle and miniaturization of the washing device.

Further, it is another object for this invention to provide a vehicle lamp washing device with realizing a small size and reduction of manufacturing cost of the washing device with securing a good rectification function.

Still further, it is another one of objects of this invention to provide a vehicle lamp washing device which solves the above problems, and which is reduced in profile.

To this end, a vehicle lamp washing device of the invention is characterized by the first aspect of this invention comprising: a spray nozzle which includes a supported section, and a spray section for spraying cleaning water; a nozzle holder into which the supported section of the spray nozzle is inserted to support the spray nozzle so as to allow rotation about an imaginary axis extending in a direction in which the spray nozzle is inserted into the nozzle holder; and a water-supply unit which has a fluid passage for supplying cleaning water to the spray nozzle and which is connected to the nozzle holder.

Accordingly, in the vehicle lamp washing device of the invention, the spraying direction of the washing device is adjusted by means of rotating the spray nozzle about an imaginary axis extending in an insertion direction of the spray nozzle in relation to the nozzle holder.

Therefore, since the spray nozzle is rotatable in relation to the nozzle holder, the spraying direction of cleaning water from the spray nozzle can be adjusted, thereby enhancing a washing function. In addition, a washing device can be installed in the event of a vehicle model change, whereby versatility can be increased.

In addition, since the spray nozzle is rotatable only about an imaginary axis extending in a direction where the spray nozzle is inserted into the nozzle holder, a relief space does not need to be formed inside the nozzle holder for the case where the spray nozzle is adjusted in a direction tilted toward the nozzle holder. Accordingly, the washing device can be miniaturized, and reduced in profile.

According to the second aspect of the invention, the supported section of the spray nozzle is formed substantially into a cylindrical shape extending in the insertion direction. Therefore, the spray nozzle can be easily formed.

According to the third aspect of the invention, when an imaginary axis extending in the insertion direction of the spray nozzle in relation to the nozzle holder is taken as a first imaginary axis, the nozzle holder is supported on the water-supply unit so as to be rotatable about a second imaginary axis whose axial direction differs from that of the first imaginary axis. Therefore, the degree of freedom in adjusting the direction for spraying cleaning water from the spray section is increased, and functionality of the washing device is further enhanced.

According to the fourth aspect of the invention, the water-supply unit is connected to a cylinder for pumping cleaning water; and the connecting direction between the nozzle holder and the water-supply unit is set to a direction tilted by a predetermined angle in relation to a direction in which the cleaning water is pumped by the cylinder. Therefore, the degree of freedom in adjusting the direction for spraying cleaning water from the spray section is increased, and functionality of the washing device is enhanced.

According to the fifth aspect of the invention, a water-supply pipe to be connected to the nozzle holder is provided in the water-supply unit; a pair of openings for supplying cleaning water to the spray nozzles is formed in the water-supply pipe; and nozzle holders are respectively connected to the pair of openings. Therefore, washing capability is enhanced. The washing device is particularly advantageous for washing a vehicle headlamp which is elongated in a direction where the spray nozzles are disposed.

According to the sixth aspect of the invention, the vehicle lamp washing device is configured so as to protrude outside of the vehicle body when the washing device is in use, and so as to be housed inside the vehicle body when the washing device is not in use. Therefore, since the washing device protrudes only in a case of necessity, favorable appearance of the vehicle can be ensured when the washing device is not in use, and the washing device can be protected from damage.

Note that the vehicle body may include a part of the vehicle lamp. At this time, the vehicle lamp washing device protrudes from the part of the vehicle lamp.

According to the seventh aspect of the invention, a collar having a function of rectifying cleaning water supplied from the nozzle holder to the spray nozzle is integrally formed in the nozzle holder. Therefore, the number of components and the cost of manufacturing the washing device can be reduced.

In order to so provide, a eighth aspect of the present invention is directed to a vehicle lamp washing device of the invention comprising: a supply section having a supply passage through which cleaning water is supplied; a head section including at least a spray section which sprays the cleaning water, being supplied to the supply passage of the supply section, through an orifice formed in said spray section, and an opening which is opened at one end of the head section; and a cap member for blocking the opening of the head section. The supply section and the head section are formed integrally as a spray nozzle. Further, a space is formed inside the head section so as to communicate with the supply passage, the spray section, and the opening. A reduction section formed in a way such that a diameter of the supply passage in the supply section is reduced in a direction toward the space being formed in the supply section.

Therefore, in the vehicle lamp washing device of the invention, cleaning water is rectified by the reduction section of the supply section.

Accordingly, by virtue of the reduction section, a good rectification function is ensured, and the number of components and processes required for assembling the washing device can be reduced while ensuring a good rectification function, whereby manufacturing cost can be reduced.

Furthermore, since a collar, which is a separate component from a spray nozzle, does not need to be disposed, a space for mounting the collar is not required, whereby size of the washing device can be reduced.

In the ninth aspect of this invention, there is provided an upright wall for narrowing an area of the spray orifice facing outside so as to be smaller size as compared to that of an interior space formed continuously with the spray orifice. Accordingly, immediately before that the cleaning water is sprayed from the spray orifice, water flow can be changed by the upright wall, and turbulent flow is generated, whereby the cleaning water in a state of being spread to a predetermined degree is sprayed toward the vehicle lamp. Consequently, washing efficiency can be enhanced.

In the tenth aspect of this invention, restriction sections for restricting a range of spraying cleaning water from the spray orifice are formed in the vicinity of the spray orifice of the head section. Therefore, spraying of the cleaning water toward unnecessary portions other than the vehicle lamp can be prevented, along with reduction of washing ability possibly caused by excessive spread of the spray range.

In the eleventh aspect of this invention, the vehicle lamp washing device is configured so as to protrude outside of the vehicle body when the washing device is in use, and so as to be housed inside the vehicle body when the washing device is not in use. Therefore, since the washing device protrudes only in a case of necessity, when the washing device is not in use, favorable appearance of the vehicle can be ensured, and the washing device can be protected from damage.

In addition, the washing device is housed inside the vehicle body when the washing device is not in use. Accordingly, the washing device can be down sized.

In the twelfth aspect of the vehicle lamp washing device in this invention is provided to have a spray nozzle which is configured to integrally form a supply section having a supply passage through which cleaning water is supplied, and a head section having a spray orifice from which the cleaning water is sprayed. A space is further formed inside the head section to communicate with the supply passage and the spray orifice. Accordingly, the cleaning water, which is fed from the supply passage of the supply section to the internal space, is sprayed from the spray orifice in a direction forming an acute angle with respect of a flow direction of the cleaning water through the supply passage.

Accordingly, in the vehicle washing device in this invention, the flow direction of cleaning water is changed so as to form an acute angle inside the spray nozzle.

Therefore, the flow direction of the cleaning water is changed inside the spray nozzle, and the nozzle holder for holding the spray nozzle is not required. Consequently, the washing device can be reduced in height by an amount corresponding to the nozzle holder, whereby the washing device can be reduced in profile.

BRIEF DESCRIPTION OF THE DRAWINGS

FIG. 1 shows, along with FIGS. 2 to 6, a best mode of the present invention, wherein FIG. 1 is a schematic side view showing a washing device in conjunction with a portion of a vehicle body;

DESCRIPTION OF THE PREFERRED EMBODIMENTS

Hereinafter, the best mode of a vehicle lamp washing device of the invention will be described by reference to the drawings. In the best mode described hereafter below, the vehicle lamp washing device of the invention is applied to a vehicle headlamp washing device. It should be noted that the scope of the invention is not limited to a vehicle headlamp washing device, and the invention can be broadly applied to all vehicle lamp washing devices.

Figure 1:
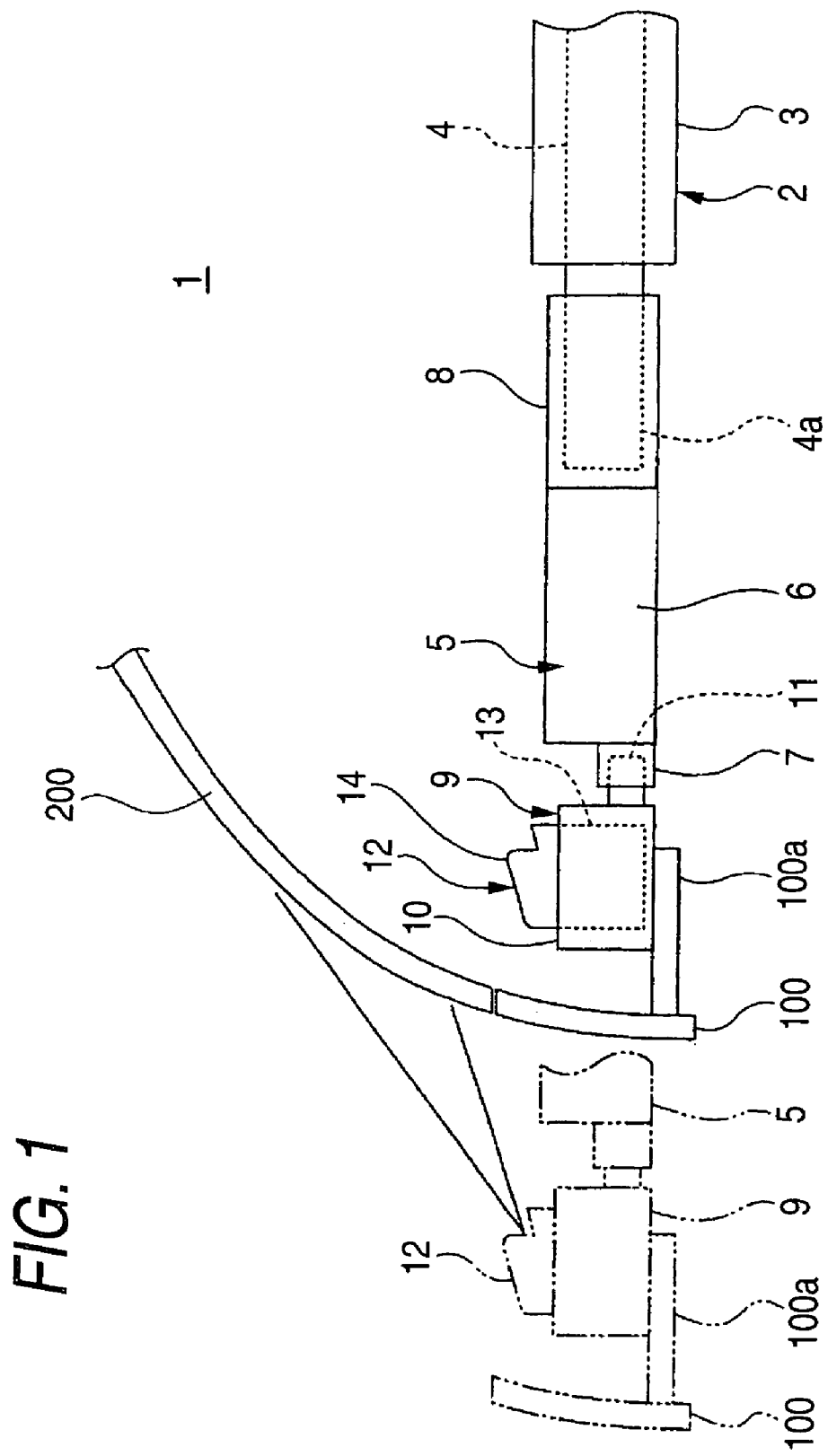

As shown in FIG. 1, a main body section 2 of a washing device 1 is fixed to the inside of a cover member 100 disposed at an external surface of a vehicle body. Examples of the cover member 100 include such a member for opening—and closing an opening disposed in a bumper, a lens member inside which a lens-step is formed, and the like.

The main body section 2 is constituted of a cylinder 3, and a piston 4 supported by the cylinder 3 so as to be slidable in a longitudinal direction. The cylinder 3 is connected to an unillustrated cleaning water tank by means of piping means, and is fixed onto an unillustrated inside of a vehicle body or a vehicle headlamp 200. An unillustrated helical extension spring having a restoration force in a direction for pulling the piston 4 inside the cylinder 3 is disposed inside the cylinder 3. One end of the piston 4 is formed into a water-supply connecting section 4a.

Figure 2:
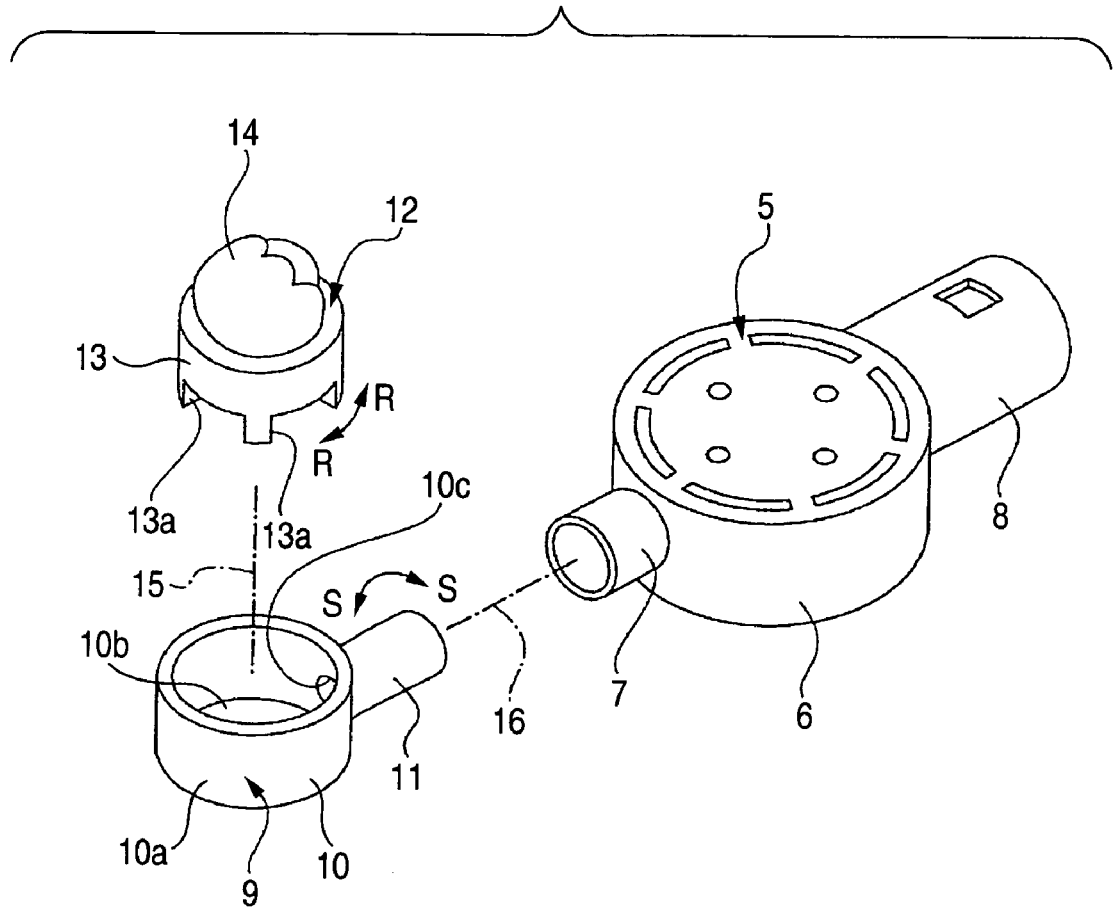
FIG. 2 is an enlarged-and-exploded perspective view showing a water-supply unit, a nozzle holder, and a spray nozzle.

A water-supply unit 5 is connected to the water-supply connecting section 4a of the piston 4 (see FIG. 1). The water-supply unit 5 is, as shown in FIG. 2, constituted of a valve-seating section 6, a water-supply pipe 7, and a connecting pipe 8, wherein the water-supply pipe 7 and the connecting pipe 8 protrude from the valve-seating section 6 in opposite directions. An unillustrated check valve is disposed inside the valve-seating section 6. The water-supply unit 5 is connected to the water-supply connecting section 4a of the piston 4 at the connecting pipe 8 protruding rearward from the valve-seating section 6.

Figure 3:
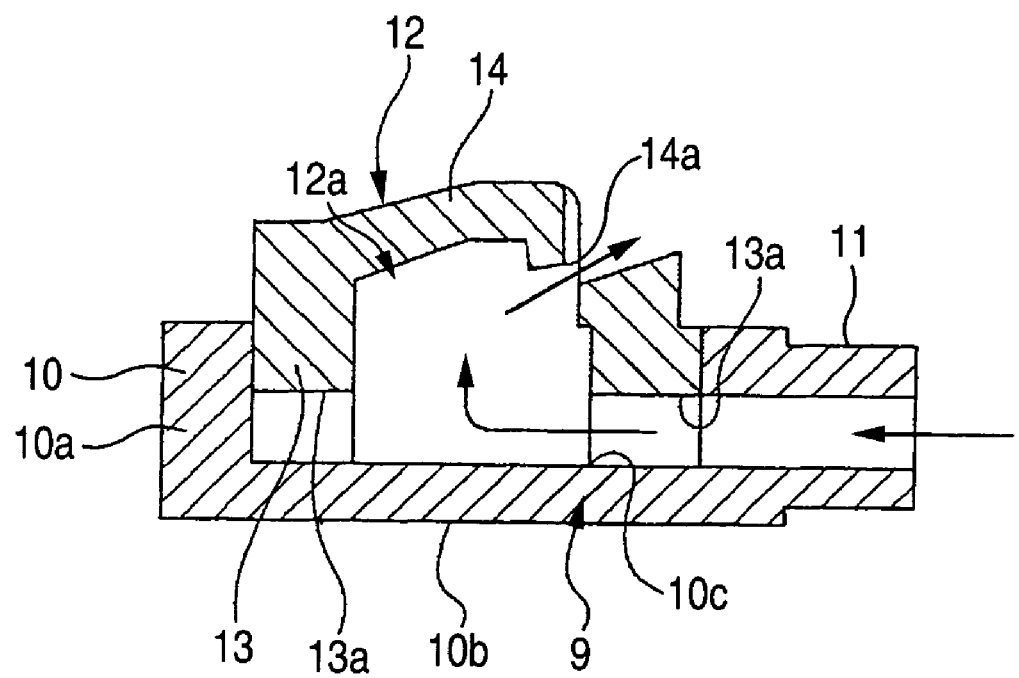
FIG. 3 is an enlarged cross-sectional view showing a state where the spray nozzle is held by the spray holder.

A nozzle holder 9 is connected to the water-supply pipe 7 of the water-supply unit 5 by means of press-fitting (see FIGS. 1 and 2). The nozzle holder 9 is, as shown in FIGS. 2 and 3, configured by means of integrally forming a holding section 10 and a connecting section 11 protruding from the holding section 10. The holding section 10 is constituted of an annular section 10a of a cylindrical shape, and a bottom face section 10b for blocking a lower opening of the annular section 10a. An opening 10c is formed on the annular section 10a. The connecting section 11 is formed into a cylindrical shape protruding rearward from the annular section 10a. The internal space of the connecting section 11 is connected to the opening 10c of the annular section 10a. The nozzle holder 9 is connected to the water-supply pipe 7 of the water-supply unit 5 by way of the connecting section 11.

The cover member 100 is attached to the holding section 10 of the nozzle holder 9 by way of a mounting section 100a (see FIG. 1).

A spray nozzle 12 is held in the nozzle holder 9 in a rotatable state (see FIGS. 2 and 3). The spray nozzle 12 is configured by means of integrally forming a supported section 13 formed into a cylindrical shape of small height, and a spray section 14 disposed so as to block an upper opening of the supported section 13. The supported section 13 is formed so as to have an outer diameter substantially equal to an inner diameter of the annular section 10a of the nozzle holder 9. Notches 13a, 13a, . . . are formed at intervals in the circumferential direction along the lower end of the supported section 13. The spray section 14 protrudes upward from the supported section 13, and a spray orifice 14a is formed on an upper end of the spray section 14.

A spray fluid passage 12a for spraying cleaning water is formed inside the spray nozzle 12. The spray fluid passage 12a communicates with the spray orifice 14a and the notches 13a, 13a, . . .

The spray nozzle 12 is held such that the supported section 13 is forcibly inserted from above into the holding section 10 of the nozzle holder 9. Under a state where the supported section 13 is held by the holding section 10, the supported section 13 is rotatable about a direction in which the supported section 13 is inserted into the holding section 10; that is, about a first imaginary axis 15 (see FIG. 2) extending vertically. Accordingly, orientation of the spray orifice 14a can be changed by means of rotating the supported section 13 about the first imaginary axis 15 in direction R-R shown in FIG. 2, whereby the spraying direction of cleaning water sprayed from the spray orifice 14a can be adjusted.

Next, operation of the washing device 1 will be described.

In an unused state; that is, a state where cleaning water is not supplied to the cylinder 3, the piston 4, except for a tip thereof, is pulled inside the cylinder 3 by a restoration force of the helical extension spring disposed inside the cylinder (a state indicated by solid lines in FIG. 1).

When cleaning water is pumped from a cleaning water tank and reaches inside the cylinder 3, the cleaning water is supplied from the cylinder 3 to the valve-seating section of the water-supply unit 5. When hydraulic pressure of the cleaning water in the cylinder 3 is increased, the piston 4 protrudes from the cylinder 3 in response to the hydraulic pressure. Along with this, the spray nozzle 12, the nozzle holder 9, and the water-supply unit 5 integrally protrude outside the vehicle body (a state indicated by two-dotted chain lines in FIG. 1).

When supply of the cleaning water from the cleaning water tank to the cylinder 3 is stopped, the check valve is closed, in response to a drop in the hydraulic pressure. When the hydraulic pressure drops further, the piston 4 is pulled inside the cylinder 3 by the restoration force of the helical tension spring. Along with this, the spray nozzle 12, the nozzle holder 9, and the water-supply unit 5 are returned their original positions assumed before washing.

As described above, in the washing device 1, since the spray nozzle 12 is rotatable in relation to the nozzle holder 9, the spraying direction of cleaning water from the spray nozzle 12 can be adjusted, and a washing function can be enhanced. In addition, the washing device 1 can be installed in the event of a vehicle model change, thereby enhancing versatility.

Further, since the spray nozzle 12 is rotatable only about the first imaginary axis 15 in relation to the nozzle holder 9, a relief space does not need to be formed inside the nozzle holder 9 for a case where the spray nozzle is adjusted in a direction tilted toward the nozzle holder. Accordingly, the washing device 1 can be miniaturized, and reduced in profile.

Furthermore, in the washing device 1, since the supported section 13 of the spray nozzle 12 is formed into a substantially cylindrical shape, the spray nozzle 12 can be formed easily.

In addition, as described above, the washing device 1 protrudes outside the vehicle body when the washing device is in use, and is housed inside the vehicle body when the washing device is not in use. Accordingly, since the washing device 1 protrudes only in case of necessity, favorable appearance of the vehicle can be ensured when the washing device is not in use, and the washing device 1 can be protected from damage.

Meanwhile, in the washing device 1, the nozzle holder 9 may be configured so as to be able to rotate about the direction in which the connecting section 11 is connected to the water-supply pipe 7; that is, the rotational direction of a second imaginary axis 16 (see FIG. 2) extending longitudinally (i.e., direction S-S shown in FIG. 2) in relation to the water-supply unit 5.

As described above, by means of configuring the nozzle holder 9 so as to allow rotation about the second imaginary axis 16 extending in a direction different from that of the first imaginary axis 15, the degree of freedom in adjusting the direction for spraying cleaning water from the spray section 14 is increased, and functionality of the washing device 1 is further enhanced.

Figure 4:
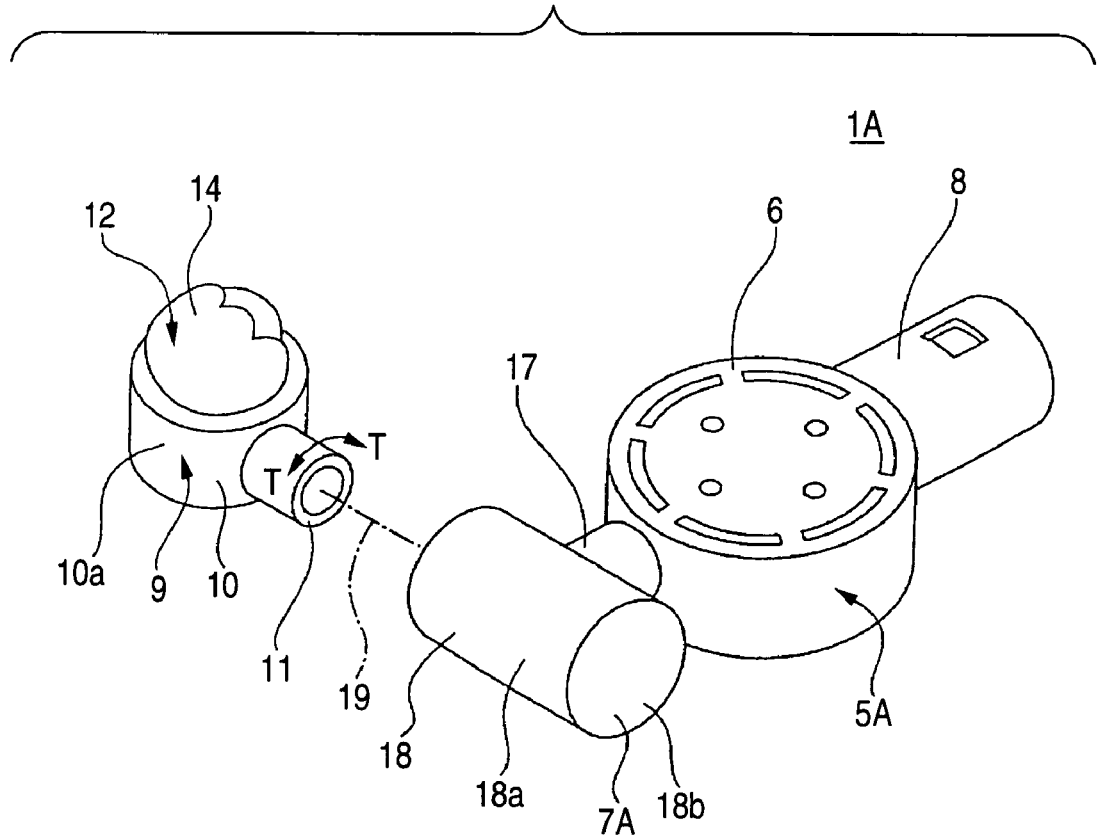
FIG. 4 is an enlarged perspective view showing a partially exploded washing device according to the first embodiment.

Next, a first embodiment of the washing device will be described (see FIG. 4).

A washing device 1A according to the first embodiment in the following description differs from the above-mentioned washing device 1 only in that the connecting direction of the nozzle holder in relation to the water-supply unit differs from that of the washing device 1. Accordingly, detailed descriptions will be given of only sections different from those of the washing device 1; other sections are denoted by the same reference numerals as those of the washing device 1, and repeated descriptions are omitted.

The washing device 1A has a water-supply unit 5A, the nozzle holder 9, and the spray nozzle 12, in addition to the main body section 2.

The water-supply unit 5A is connected to a water-supply connecting section 4a of the piston 4. The water-supply unit 5A is configured by means of integrally forming the valve-seating section 6, a water-supply pipe 7A, and the connecting pipe 8, wherein the water-supply pipe 7A and the connecting pipe 8 protrude from the valve-seating section 6 in opposite directions.

The water-supply pipe 7A is constituted of a base section 17 protruding forward from the valve-seating section 6, and a coupling section 18 disposed on the front end of the base section 17. The base section 17 is formed into a cylindrical shape whose longitudinal direction is parallel to the axial direction. The coupling section 18 is constituted of a cylindrical section 18a whose lateral direction extends axially, and a blockage section 18b for blocking one of the openings of the cylindrical section 18a. The coupling section 18 is in communication with the base section 17 at its lateral center. The internal space of the base section 17 and that of the coupling section 18 are in mutual communication.

The nozzle holder 9 is connected to the coupling section 18 of the water-supply pipe 7A of the water-supply unit 5A. The nozzle holder 9 is connected to the water-supply unit 5A such that the connecting section 11 is forcibly inserted into the coupling section 18 from a lateral direction; e.g., from the left. Therefore, the connecting direction between the nozzle holder 9 and the water-supply unit 5A is parallel to an axial direction of the third imaginary axis 19 extending laterally.

In a state where the nozzle holder 9 is connected to the water-supply unit 5A, the nozzle holder 9 is rotatable about a third imaginary axis 19 in relation to the water-supply unit 5A. Accordingly, in the washing device 1A, orientation of the spray orifice 14a can be changed by means of rotating the nozzle holder 9 about the third imaginary axis 19 in direction T-T shown in FIG. 4, whereby the spraying direction of cleaning water sprayed from the spray orifice 14a can be adjusted.

As described above, by means of configuring the nozzle holder 9 rotatable in a rotational direction of the third imaginary axis 19 extending in a direction different from that of the first imaginary axis 15, the degree of freedom in adjusting the direction for spraying cleaning water from the spray section 14 is increased, and functionality of the washing device 1A can be enhanced.

Furthermore, in the washing device 1A, since the connecting direction between the nozzle holder 9 and the water-supply unit 5A is set to be lateral, the spray nozzle 12 is located in a lateral direction (on the right or left) of the water-supply unit 5A. Therefore, the washing device 1A can be advantageously installed in a vehicle model which has a small longitudinal footprint but which has room in the lateral direction.

In the above, an example has been described in which the nozzle holder 9 is allowed to rotate about the third imaginary axis 19 perpendicular to the second imaginary axis 16. However, the axial direction of the third imaginary axis 19 is not limited to a direction perpendicular to the axial direction of the second imaginary axis 16; and the essential condition is that the axial direction of the third imaginary axis 19 is tilted by an arbitrary angle from the second axis 16, so long as it is a direction different from the axial direction of the first imaginary axis 15.

Figure 5:
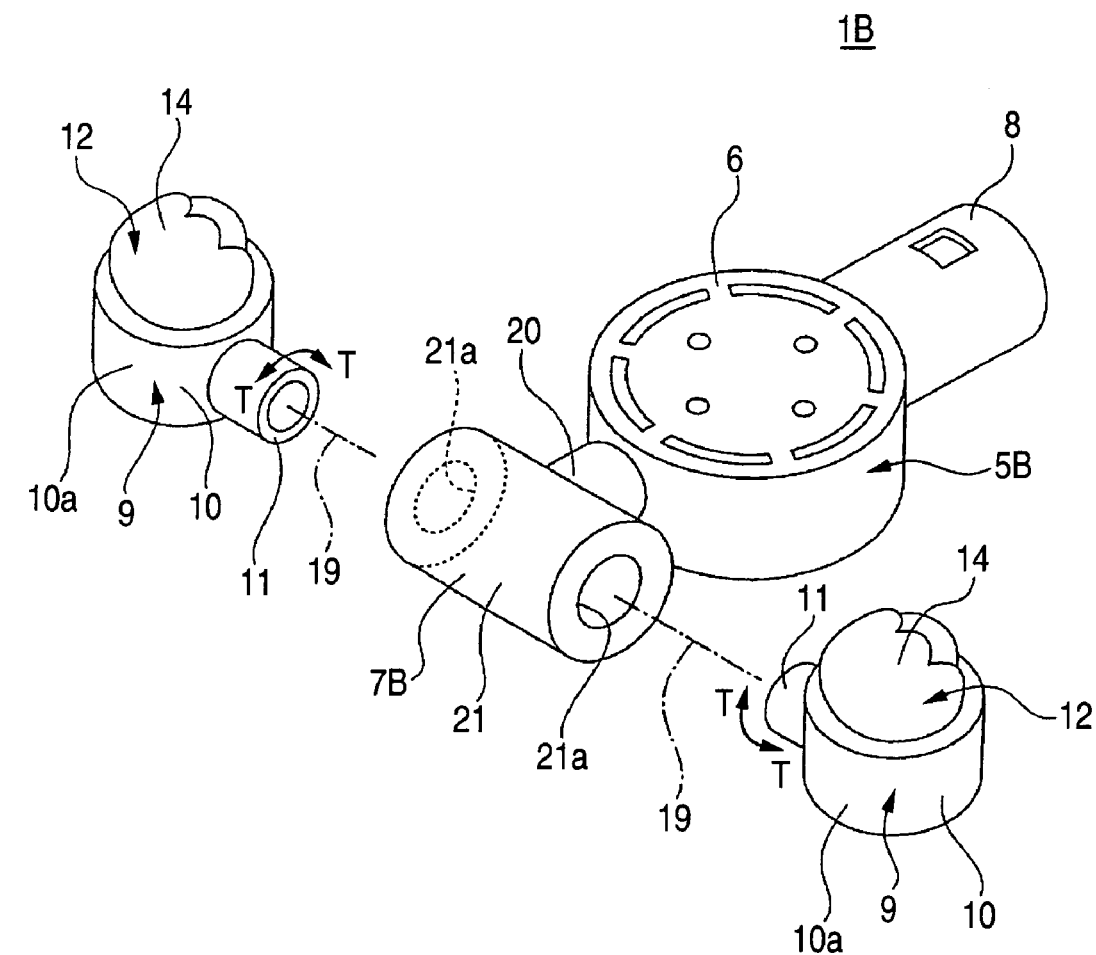
FIG. 5 is an enlarged perspective view showing a partially exploded washing device according to the second embodiment.

Next, a second embodiment of the washing device will be described (see FIG. 5).

A washing device 1B according to the second embodiment in the following description differs from the above-mentioned washing device 1 only in that the connecting direction of the nozzle holder in relation to the water-supply unit differ from those of the washing device 1, and the number of nozzle holders differs from the same. Accordingly, detailed descriptions will be given only in relation to sections that differ from those of the washing device 1; other sections are denoted by the same reference numerals as those of the washing device 1, and repeated descriptions are omitted.

The washing device 1B has a water-supply unit 5B, the nozzle holders 9, 9, and the spray nozzles 12, 12, in addition to the main body section 2.

The water-supply unit 5B is connected to the water-supply connecting section 4a of the piston 4. The water-supply unit 5B is configured by means of integrally forming the valve-seating section 6, a water-supply pipe 7B, and the connecting pipe 8, wherein the water-supply pipe 7B and the connecting pipe 8 protrude from the valve-seating section 6 in opposite directions.

The water-supply pipe 7B is constituted of a base section 20 protruding forward from the valve-seating section 6, and a coupling section 21 disposed on the front end of the base section 20. The base section 20 is formed into a cylindrical shape whose longitudinal direction is parallel to the axial direction. The coupling section 21 is constituted of a cylindrical shape whose lateral direction is parallel to the axial direction; and openings 21a, 21a are formed on the left and right sides, respectively. The coupling section 21 communicates with the base section 20 at its lateral center, and the internal space of the base section 20 and that of the coupling section 21 is in communication with each other.

The nozzle holders 9, 9 are respectively connected to the coupling section 21 of the water-supply pipe 7B of the water-supply unit 5B. The nozzle holders 9, 9 are respectively connected to the water-supply unit 5B such that the connecting sections 11, 11 are forcibly inserted into the base section 20 from the openings 21a, 21a. As a result, the connecting direction of the nozzle holders 9, 9 in relation to the water-supply unit 5B is parallel to the axial directions of the third axes 19, 19 extending laterally.

Under a state where the nozzle holders 9, 9 are connected to the water-supply unit 5B, the nozzle holders 9, 9 are respectively rotatable about the third axes 19, 19 in relation to the water-supply unit 5B. Accordingly, in the washing device 1B, orientations of the spray orifices 14a, 14a can be changed by means of rotating the nozzle holders 9, 9 about the third axes 19, 19 in direction T-T shown in FIG. 5, whereby spraying directions of cleaning water sprayed from the spray orifices 14a, 14a can be adjusted.

As described above, by means of configuring the nozzle holders 9, 9 rotatable in rotational directions of the third axes 19, 19 which extend in directions different from that of the first imaginary axis 15, the degree of freedom in adjusting directions for spraying cleaning water from the spray sections 14, 14 is increased, and functionality of the washing device 1B is enhanced.

Further, in the washing device 1B, since a pair of spray nozzles 12, 12 are disposed, washing capability can be enhanced. The washing device 1B is particularly advantageous for washing a vehicle headlamp elongated in a direction along which the spray nozzles 12, 12 are disposed.

Furthermore, in the washing device 1B, the connecting direction between the nozzle holder 9 and the water-supply unit 5B is set to be a lateral direction. Accordingly, since each of the spray nozzles 12 is located in a lateral direction (on the right or left) of the water-supply unit 5A, the washing device 1A can be advantageously installed in a vehicle model which has a small longitudinal footprint but which has room in the lateral direction.

In the above, an example has been described in which the nozzle holders 9, 9 are configured to be rotatable in a rotational direction of the third axes 19, 19 which are perpendicular to the second imaginary axis 16. However, the axial directions of the third axes 19, 19 are not limited to the direction perpendicular to the second imaginary axis 16, and the essential condition is that the axial directions of the third axes 19, 19 be tilted by arbitrary angles from the second imaginary axis 16, so long as the axial directions different from the axial direction of the first imaginary axis 15.

Figure 6:
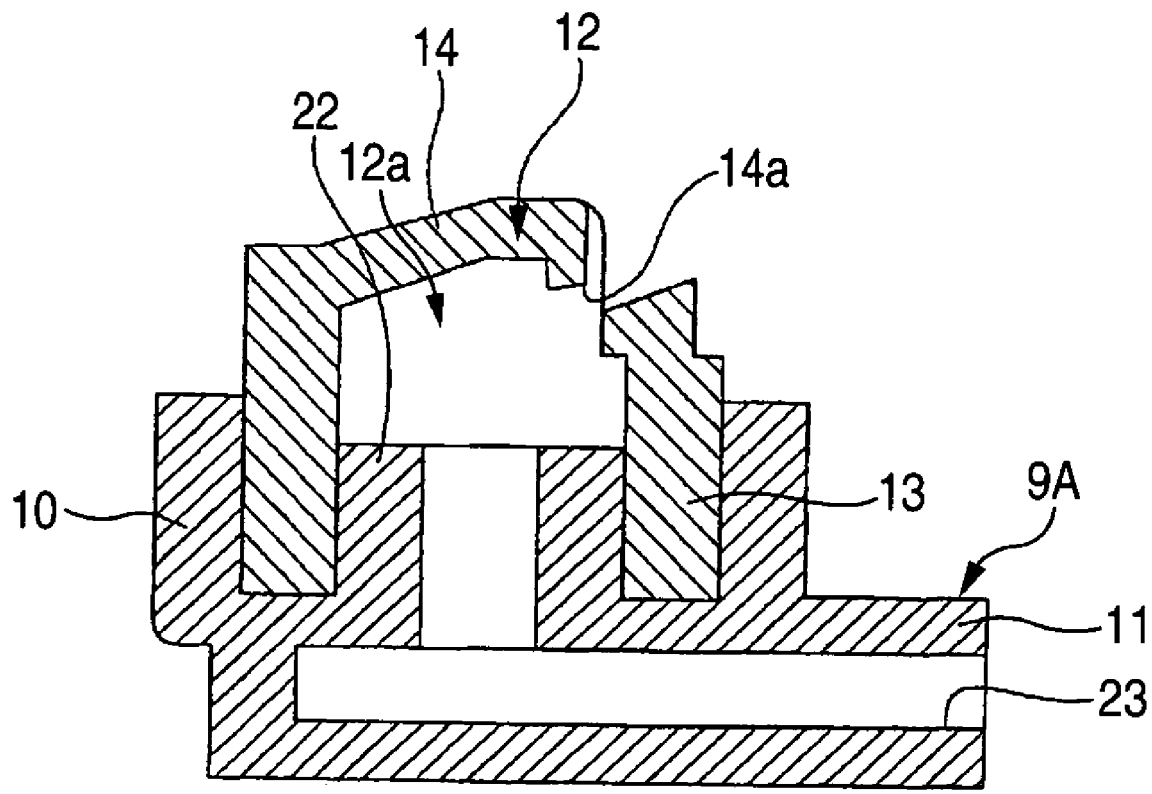
FIG. 6 is an enlarged cross-sectional view showing a state where the spray nozzle is held by the spray holder in which a collar is disposed.

The washing device 1, 1A, or 1B may be configured to include a collar having a function of rectifying cleaning water. In this case, as shown in, e.g., FIG. 6, a collar 22 fitted to the inside of the supported section 13 of the spray nozzle 12 can be formed integrally with a nozzle holder 9A. In the case where the collar 22 is integrally formed in the nozzle holder 9A, as shown in FIG. 6, the nozzle holder 9A needs to be formed into such a shape that a fluid passage 23 for cleaning water is disposed under the collar 22.

By means of integrally forming the collar 22 and the nozzle holder 9A, the number of components and manufacturing cost of the washing device can be reduced.

In the above, examples have been described in which the washing device 1, 1A, or 1B is applied to a type which protrudes outside of the vehicle body when the washing device is in use and is housed in the vehicle body when the washing device is not in use. However, the washing device 1, 1A, or 1B is not limited to such a type, and can be applied to a type in which the position of the spray nozzle 12 does not change between the case where the washing device is in use and the case where the washing device is not in use; for instance, a type in which the nozzle holder 9 is used by being fixed onto a bumper, or the like, constituting a portion of the vehicle body.

Specific shapes and structures of the respective sections described in the above-mentioned best mode indicate only an example of embodiments of the present invention; and it is to be understood that the technical scope of the invention should not be limited to the specific embodiment thereof.

Next, another outline of a vehicle headlamp will be described in FIG. 7 for the purpose of explaining the third to fifth embodiments of the present invention as will be described below.

A vehicle headlamp 200 has an illumination unit 201, which is disposed in a space 204 defined by a lens cover 202 and a lens body 203.

The illumination unit 201 includes an inner panel 205, a reflecting mirror 206 attached to the rear end of the inner panel 205, a light source 207 attached to the reflecting mirror 206, and a projection lens 208 for projecting light emitted forward from the light source 207. The projection lens 208 protrudes forward from an opening 205a formed in the inner panel 205. A light-shielding member 210 is disposed in a space 209 formed by means of the reflecting mirror 206. The light-shielding member 210, which is located forward of the light source 207, shields the downward light that is emitted from the light source 207, and emphasize a boundary between light and shade in vehicular light distribution.

A cover unit 211 is disposed under the lens cover 202. The cover unit 211 is constituted of a lens section 211a formed from a transparent material, and a reflection section 211b formed from an opaque material. The cover unit 211 is configured such that the reflection section 211b can be visually recognized through the lens section 211a, and a washing device, which will be described later and is disposed rearward of the reflection section 211b, cannot be visually recognized.

The cover unit 211 is a member, for instance, for opening and closing an opening formed in a bumper.

A mounting section 212 is disposed on the cover unit 211 so as to protrude rearward. Holding members 213 are mounted on a lower surface section 203a of the lens body 203 so as to protrude downwardly.

A washing device 101 is held by the holding members 213, 213 disposed on the lower surface section 203a of the lens body 203 at a main body section 102 of the washing device 101.

Figure 7:
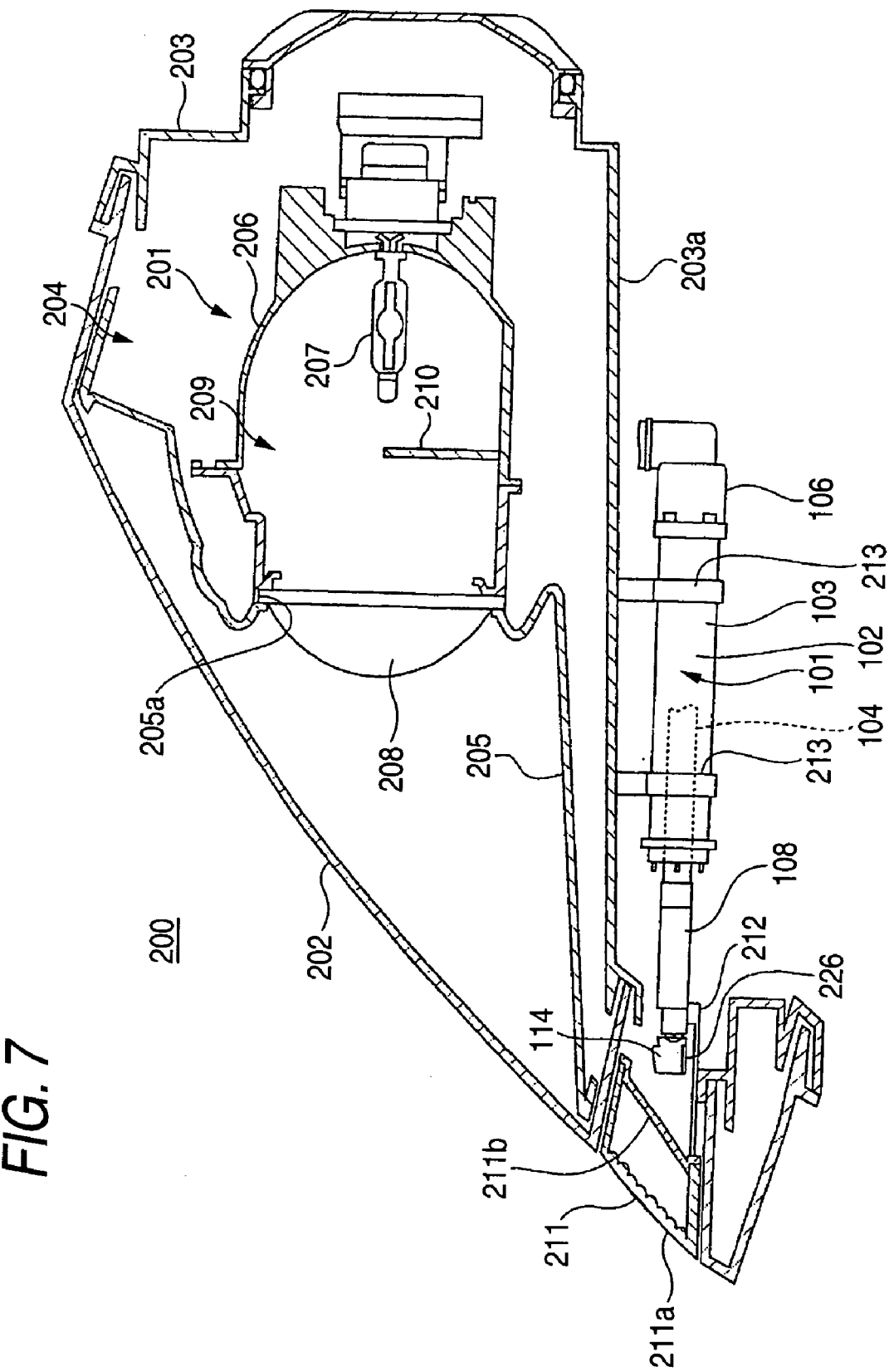
FIG. 7 shows, along with FIGS. 8 to 12, a partially cross sectional side view, showing a washing device in a state of not being in use, in conjunction with a portion of a vehicle body.
Figure 8:
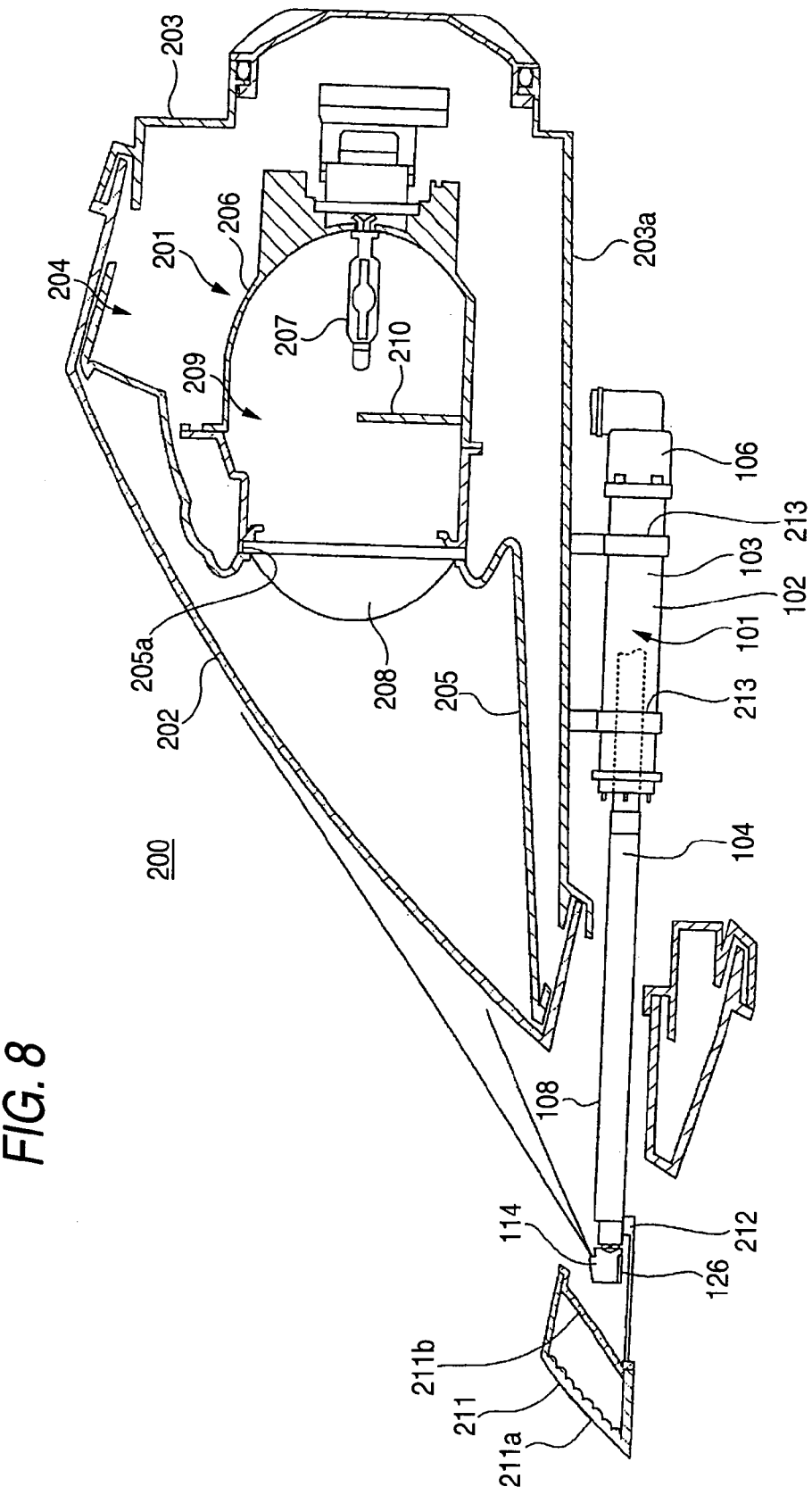
FIG. 8 is a partially cross-sectional side view, showing the washing device in a state of being in use in conjunction with a portion of a vehicle body.

The main body section 102 includes a cylinder 103, and a piston 104 supported by the cylinder 103 so as to be slidable in a longitudinal direction (see FIGS. 7 and 8).

Figure 9:
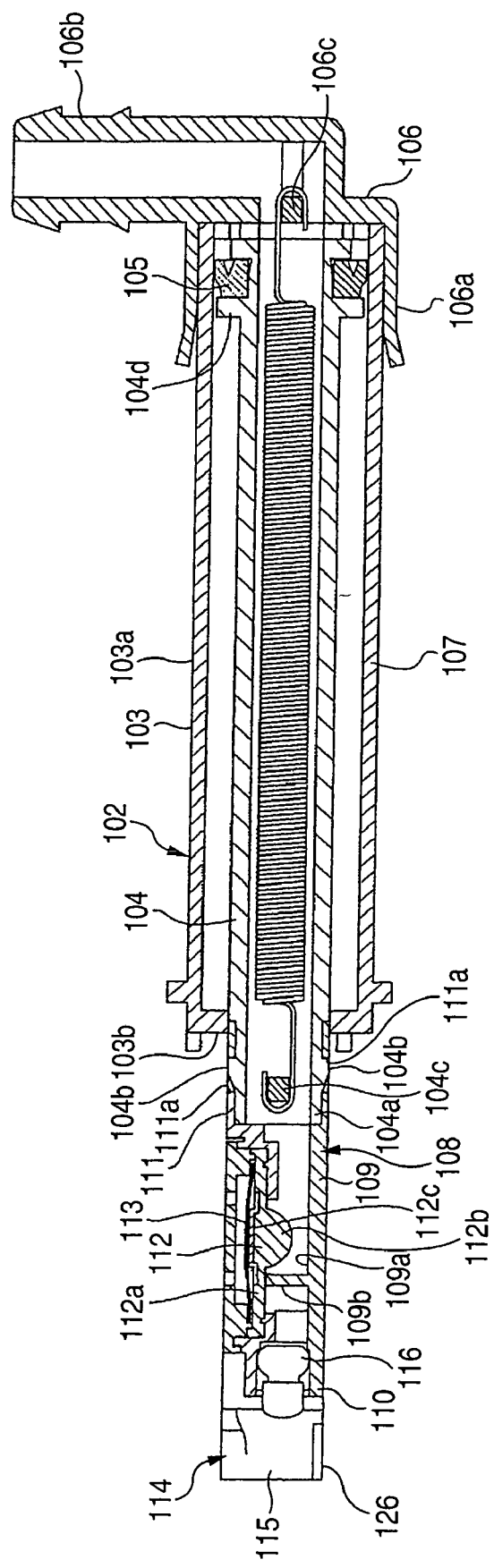
FIG. 9 is an enlarged cross-sectional view showing the washing device.

The cylinder 103 is, as shown in FIG. 9, configured by means of integrally forming a cylindrical section 103a elongated in a longitudinal direction, and an inner flange section 103b disposed on the front edge of the cylindrical section 103a.

The piston 104 is formed into a substantially cylindrical shape elongated in a longitudinal direction such that the longitudinal length thereof is slightly longer than that of the cylindrical section 103a of the cylinder 103. The front end of the piston 104 is formed as a water-supply connecting section 104a whose outer diameter is smaller than other portions. Mating protrusions 104b, 104b protruding outward are disposed on the water-supply connecting section 104a. A spring-hook protrusion 104c is disposed inside the piston 104 at a position closer to the front end. A stopper protrusion 104d jutting outward is disposed on the piston 104 at a position closer to the rear end. A sliding ring 105 formed from, e.g., rubber material, or the like, is attached to the backside of the stopper protrusion 104d in a fitting-over manner.

The sliding ring 105 close-contacts the inner side of the cylinder 103 under a state where the piston 104 is supported by the cylinder 103. The piston 104 can move forward in relation to the cylinder 103 until the stopper protrusion 104d comes in contact with the inner flange section 103b of the cylinder 103.

The cover unit 211 is attached to the mounting section 212 protruding from the water-supply unit, which will be described later, connected to the piston 104 (see FIG. 7).

An end cap 106 is attached to the rear end of the cylinder 103 in a fitting-over manner. The end cap 106 is configured by means of integrally forming a cylinder-mount section 106a which is formed into a substantially cylindrical shape, and a connecting pipe section 106b which is disposed at the rear end of the cylinder-mount section 106a and which protrudes upward therefrom. A spring-support protrusion 106c is disposed inside the end cap 106. The connecting pipe section 106b of the end cap 106 is connected to an unillustrated pressure pump, which is connected to an unillustrated cleaning water tank and is fixed to an unillustrated interior of the vehicle body or the vehicle headlamp 200.

The end cap 106 is attached to the rear end of the cylinder 103 at the cylinder-mount section 106a. With the cylinder-mount section 106a is attached to the rear end of the cylinder 103, a helical extension spring 107 is disposed between the spring-hook protrusion 104c of the piston 104 and the spring-support protrusion 106c of the end cap 106 in a tensioned state. Accordingly, the piston 104 is tensioned so as to be pulled rearward; that is, toward the inside of the cylinder 103, by means of the helical tension spring 107.

A water-supply unit 108 is connected to the water-supply connecting section 104a of the piston 104 (see FIG. 9). The water-supply unit 108 is constituted of a valve-seating section 109, a washing-fluid supply pipe 110, and a connecting pipe 111, wherein the washing-fluid supply pipe 110 and the connecting pipe 111 protrude from the valve-seating section 109 in opposite directions.

An internal space 109a of the valve-seating section 109 communicates with the washing-fluid supply pipe 110 and the connecting pipe 111. A cut-off wall 109b protruding upward from the lower surface of the valve-seating section 109 is disposed inside the valve-seating section 109. A check valve 112 is disposed inside the valve-seating section 109.

The check valve 112 has a main section 112a formed into a substantially disc shape, and a protrusion 112b protruding downward from a center section of the main section 112a. A receiving section 112c is disposed at the upper surface of the center section of the main section 112a. A cone-shaped disc spring 113 is disposed on the upper surface of the check valve 112, and the center of the cone-shaped disc spring 113 remains in resilient contact with the receiving section 112c.

The cone-shaped disc spring 113 and the check valve 112 are mounted such that the outer peripheries thereof contact closely inside the valve-seating section 109. The check valve 112 resiliently contacts the upper edge of the cut-off wall 109b at the lower surface of the main section 112a by a restoration force of the cone-shaped disc spring 113 under a state where hydraulic pressure of a predetermined value or higher is not applied on the check valve 112. Accordingly, under a state where the check valve resiliently contacts the cut-off wall 109b, the internal space 109a of the valve-seating section 109 is separated into two spaces with the cut-off wall 109b disposed therebetween.

The connecting pipe 111 protrudes rearward from the valve-seating section 109, and has engagement holes 111a, 111a. The connecting pipe 111 is connected to the water-supply connecting section 104a by means of the protrusions 104b, 104b being respectively engaged in the engagement holes 111a, 111a.

Figure 10:
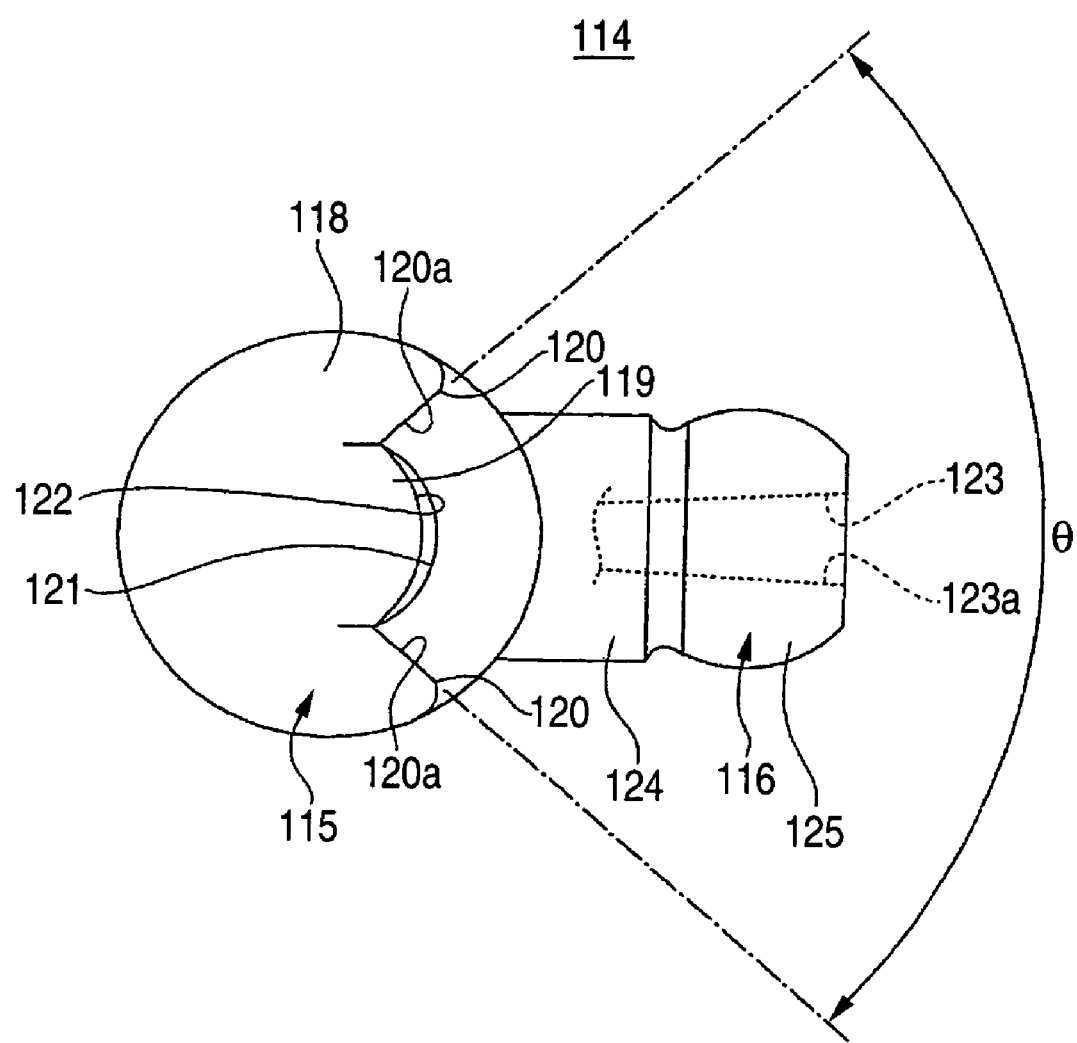
FIG. 10 is an enlarged plan view showing a spray nozzle.

A spray nozzle 114 is connected to a water-supply pipe 110 of the water-supply unit 108 by means of press-fitting (see FIG. 9). The spray nozzle 114 is configured by means of integrally forming a head section 115 and a supply section 116 (see FIGS. 10 and 11).

The head section 115 is constituted of a cylindrical section 117 formed into a longitudinally extending cylindrical shape, and a spray section 118 disposed so as to block an upper opening of the cylindrical section 117. The spray section 118 is constituted of a roof 119, side walls 120, 120, and a protruding wall 121.

The roof 119 is disposed so as to protrude substantially rearward from the front edge of the cylindrical section 117, and a tip of the roof 119 is formed into a substantially semicircular shape. An upright wall 119a protruding downward is disposed on the tip edge of the roof 119.

The side walls 120, 120 are disposed so as to be continuous with and on the right and left of the roof 119 so as to protrude upward from the right edge of the cylindrical section 117 and the left edge of the same. Inclined faces are formed on the sidewalls 120, 120 to be continuous from the roof 119 with separating gradually to the right and left respectively along a rearward direction. The inclined faces are thus formed as restriction sections 120a, 120a. The restriction sections 120a, 120a are set so as to have an opening angle e (see FIG. 10) of, for instance, 80°, thereby restricting a lateral spray angle of cleaning water sprayed from the spray section 118.

The protruding wall 121 is disposed so as to protrude forward from the rear edge of the cylindrical section 117, and to be located downwardly rearward of the roof 119. The tip edge of the protruding wall 121 is formed into an arc shape which corresponds to the tip edge of the roof 119.

Figure 11:
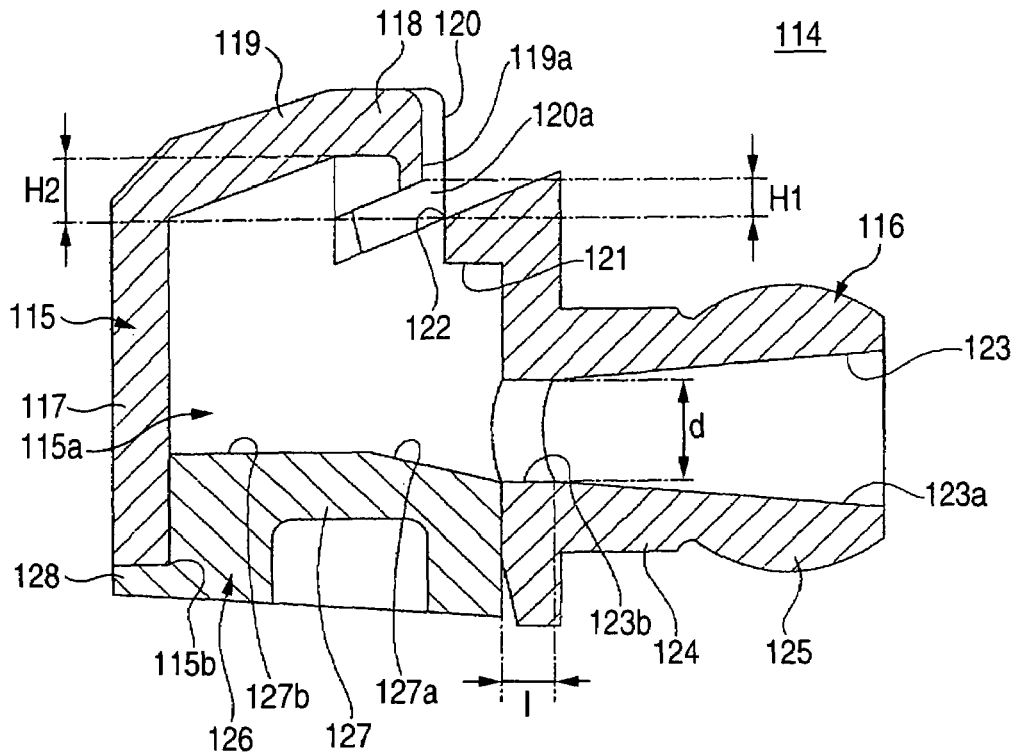
FIG. 11 is an enlarged cross-sectional view showing the spray nozzle with a cap member is attached thereto.

An opening is formed between the upright wall 119a and the protruding wall 121 of the roof 119. The opening is formed as a spray orifice 122 for spraying cleaning water. The spray orifice 122 is formed into an elongated shape extending laterally, where the upright wall 119a controls the cross-sectional area of the spray surface 122 such that outside area of the spray surface 122 becomes smaller than that of the inside area thereof. More specifically, as shown in FIG. 11, a vertical width H1 of the spray orifice 122 is smaller than a vertical width H2 of a space located immediately inside the spray orifice 122.

The supply section 116 of the spray nozzle 114 protrudes rearward from the cylindrical section 117 of the head section 115. The supply section 116 is formed into a substantially cylindrical shape, and an internal space of the supply section 116 is formed as a supply passage 123. As shown in FIG. 11, the supply passage 123 is formed as a reduction section 123a whose diameter, except for that of the front end, decreases in size in a direction toward an internal space 115a inside the head section 115. The front end of the supply passage 123 is formed as a uniform-diameter section 123b whose diameter is uniform. Therefore, the supply passage 123 is configured such that the diameter of the outer opening of the reduction section 123a is the largest.

The supply passage 123 of the supply section 116 communicates with the internal space 115a of the head section 115. The internal space 115a communicates with an opening 115b at the lower side of the head section 115 and the spray orifice 122.

The supply section 116 is configured such that a neck section 124 and a connecting section 125 have different outer shapes. The neck section 124 is formed such that an outer surface thereof is a cylindrical shape, and the connecting section 125 is formed such that an outer surface thereof is a spherical shape. The maximum outer diameter of the connecting section 125 is slightly larger than that of the neck section 124.

The opening 115b at the lower side of the head section 115 of the spray nozzle 114 is blocked by means of a cap member 126. The cap member 126 is configured by means of integrally forming a fit-in section 127, and a receiving protrusion 128 protruding forward from the lower edge of the front end of the fit-in section 127. A portion at the rear end of the upper surface of the fit-in section 127 is tilted downward in a rearward direction. The thus-inclined face is formed as a first control face 127a. In addition, a portion continuing from the front end of the first control face 127a on the upper surface of the fit-in section 127 is formed as a second control face 127b in parallel with an axial direction of the supply passage 123.

The cap member 126 is attached to the head section 115 such that the fit-in section 127 is forcibly inserted into the space 115a from underneath, thereby blocking the opening 115b. Under a state where the cap member 126 is attached to the head section 115, the receiving protrusion 128 contacts the lower surface of the cylindrical section 117, and the rear end of the first control face 127a substantially coincides with the lower end of the front opening edge of the supply passage 123. Accordingly, the cleaning water supplied from the supply passage 123 to the space 115a is guided smoothly toward the spray orifice 122 by means of flow of the cleaning water being controlled along the first control face 127a.

Here, by means of adjusting a volume ratio between the internal space 115a and the uniform-diameter section 123b (or a ratio between a cross-sectional area of the internal space 115a and that of the uniform-diameter section 123b), volume of spray, spread of spray, spray pattern, or the like, of the cleaning water can be controlled. More specifically, the shape of the internal space 115a is changed by means of adjusting positions of the first control face 127a and the second control face 127b of the cap member 126. The degree of spread of a spray pattern of cleaning water and spray density can be optimized when a cross-sectional area of the space 115a is set to 102 to 105 times that of the uniform-diameter section 123b, thereby setting a volume of the space 115a to 110 to 140 times that of the uniform-diameter section 123b.

Meanwhile, a volume of the uniform-diameter section 123b can be calculated from the radius "d/2," and the length "l" (see FIG. 11). A cross-sectional area of the uniform-diameter section 123b is a cross section parallel to the axial direction of the supply passage 123, and can be calculated by multiplying the diameter "d" and the length "l" (see FIG. 11).

The spray nozzle 114 is connected to the water-supply pipe 110 of the water-supply unit 108 by means of forcible insertion of the supply section 116. Under a state where the supply section 116 is connected to the water-supply pipe 110, the connecting section 125 whose outer surface is formed into a spherical shape contacts the inner surface of the water-supply pipe 110. Therefore, the spray nozzle 114 can be tilted in a desired direction until the outer surface of the neck section 124 of the supply section 116 contacts the front opening edge of the water-supply pipe 110, and the spraying direction of cleaning water sprayed from the spray orifice 122 can be adjusted within the tilt range.

In addition, the spray nozzle 114 is rotatable around a longitudinal direction of the supply section 116, which is a longitudinally extending axis, in relation to the water-supply unit 108. Therefore, the spraying direction of cleaning water sprayed from the spray orifice 122 can be adjusted also in the rotational direction of the axis.

Furthermore, assurance of a desired flow passage of the cleaning water and control of spray direction of the same can be achieved by means of forming the control face 127a on the cap member 126, thereby changing the volume and shape of the space 115a.

The spray nozzle 114 is connected to the water-supply pipe 110 of the water-supply unit 108 by means of forcible insertion of the supply section 116. Under a state where the supply section 116 is connected to the water-supply pipe 110, the connecting section 125 whose outer surface is formed into a spherical shape contacts the inner surface of the water-supply pipe 110. Therefore, the spray nozzle 114 can be tilted in a desired direction until the outer surface of the neck section 124 of the supply section 116 contacts the front opening edge of the water-supply pipe 110, and the spraying direction of cleaning water sprayed from the spray orifice 122 can be adjusted within the tilt range (an adjustable range is indicated by an angle "S" in FIG. 13).

Figure 14:
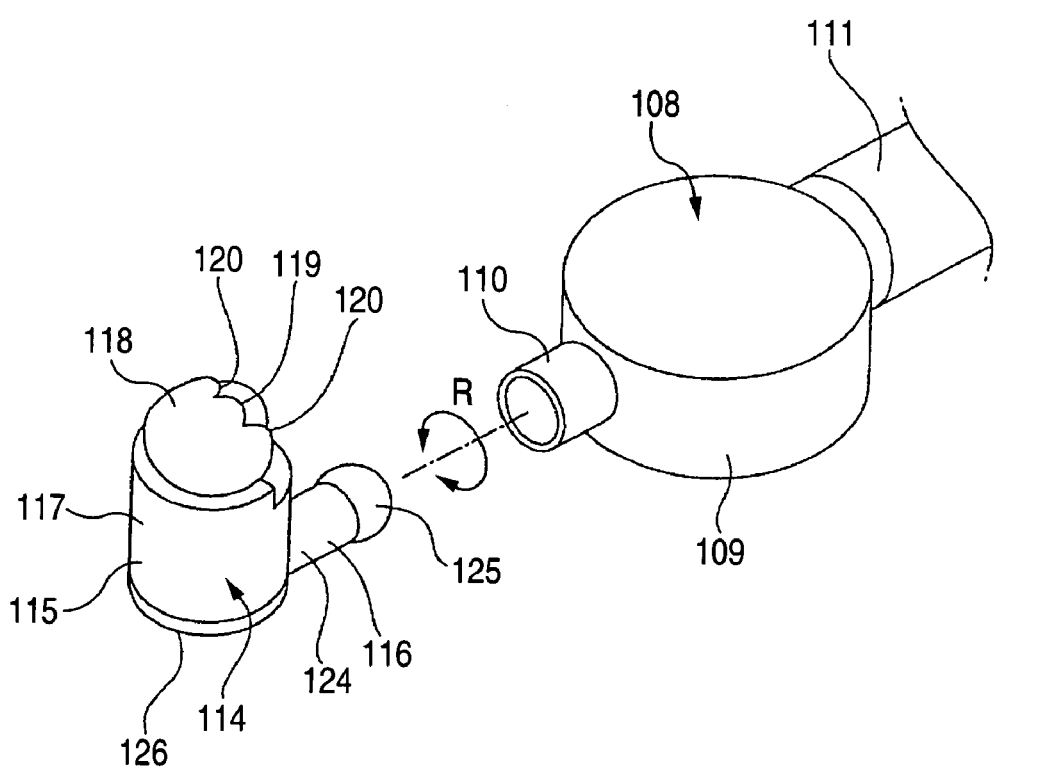
FIG. 14 is an enlarged exploded perspective view showing a spray nozzle and a water-supply unit.
Figure 15:
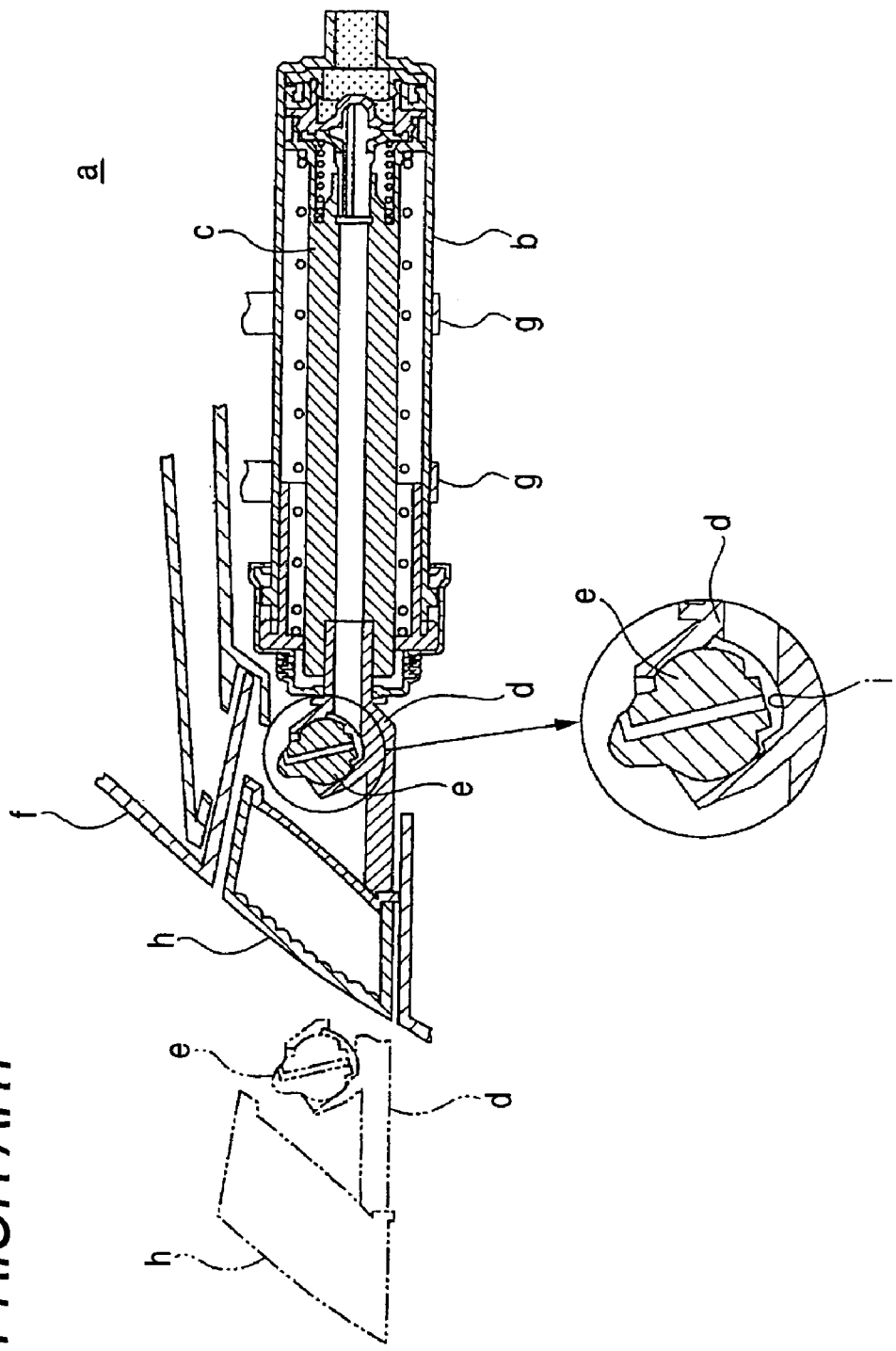
FIG. 15 is a cross-sectional view showing a conventional washing device in conjunction with a portion of a vehicle body.

In addition, the spray nozzle 114 is rotatable in a longitudinal direction of the supply section 116; that is, in a rotational direction of an axis extending longitudinally, in relation to the water-supply unit 108. Therefore, the spraying direction of cleaning water sprayed from the spray orifice 122 can be adjusted also in the rotational direction of the axis (direction R shown in FIG. 14).

Furthermore, under a state where the supply section 116 of the spray nozzle 114 is connected to the water-supply pipe 110, the water-supply pipe 110, the supply section 116, and the head section 115 are arranged substantially linearly in the longitudinal direction. Therefore, the spray nozzle 114 can be reduced in height.

Next, operation of the washing device 101 as the third embodiment will be described.

When the washing device is not used; that is, during a non-washing period where cleaning water is not supplied to the cylinder 103, the piston 104, except for the tip thereof, is pulled inside the cylinder 103 by a restoration force of the helical extension spring 107 disposed inside the cylinder 103 (see FIGS. 7 and 9).

When cleaning water is pumped from the cleaning water tank and reaches to the interior of the cylinder 103 by means of a pressure pump, the cleaning water is supplied from the cylinder 103 to the valve-seating section of the water-supply unit 108. When hydraulic pressure of the cleaning water in the cylinder 103 is increased, the piston 104 protrudes from the cylinder 103 in response to the hydraulic pressure. Along with this, the spray nozzle 114, the water-supply unit 108, and the cover unit 211 integrally protrude outside from the vehicle body (see FIG. 8).

When the piston 104 protrudes from the cylinder 103 to a predetermined position, and the hydraulic pressure of the cleaning water in the cylinder 103 is further increased to a predetermined value or higher, the check valve 112 positioned on the valve-placing section 109 of the water-supply unit 108 is moved upward against a restoration force of the cone-shaped disc spring 113 and opened; and the cleaning water passes through the valve-seating section 109 and the water-supply pipe 110, and reaches the spray nozzle 114. At this time, the cleaning water which flows through the supply passage 123 of the supply section 116 of the spray nozzle 114 is rectified by means of the reduction section 123a of the supply passage 123, whereby cleaning water is sprayed from the spray orifice 122 in an atomized form. Therefore, the reduction section 123a of the supply section 116 has a rectification function similar to that of a collar.

The cleaning water supplied from the supply passage 123 to the space 115a of the head section 115 is sprayed from the spray orifice 122 toward the surface of the lens cover 202 of the vehicle headlamp 200. Immediately before the cleaning water is sprayed from the spray orifice 122, flow passage is changed by the upright wall 119a disposed in the spray section 118, whereby turbulent flow is generated. Therefore, the cleaning water is sprayed from the spray orifice 122 in a state of being spread to a predetermined degree. Accordingly, since the cleaning water is sprayed against the lens cover 202 in a state of being spread to a predetermined degree, washing efficiency can be enhanced.

When the cleaning water is sprayed from the spray orifice 122, the restriction sections 120a, 120a formed on the side walls 120, 120 of the spray section 118 prevent the cleaning water from being spread wider than required. Therefore, spraying of the cleaning water toward unnecessary portions other than the lens cover 202, can be prevented, along with reduction of washing ability possibly caused by excessive spread of the spray range.

When supply of the cleaning water from the cleaning water tank to the cylinder 103 is stopped, the check valve 112 is moved downward and closed by a restoration force of the coned disc spring 113 in response to a drop in hydraulic pressure. When the hydraulic pressure drops further, the piston 104 is pulled inside the cylinder 103 by a restoration force of the helical tension spring 107. Along with this, the spray nozzle 114, the water-supply unit 108, and the cover unit 211 are returned their original positions assumed before washing.

As described above, in the washing device 101, the supply section 16, in which the reduction section 123a having a rectification function similar to that of a collar is formed, and the head section 115 are formed integrally. By virtue of this configuration, the number of components and man-hours required by the assembly process of the washing device 101 can be reduced while a good rectification function is ensured, whereby manufacturing cost can be reduced.

Furthermore, a collar, which is a separate component from a spray nozzle 114, does not need to be disposed for the purpose of rectification of cleaning water. Therefore, a space for mounting the collar is not required, and the washing device 101 can be miniaturized.

In addition, as described above, the washing device 101 protrudes outside the vehicle body when the washing device 101 is in use, and is housed inside the vehicle body when the washing device 101 is not in use. Accordingly, since the washing device 101 protrudes only in the case of necessity, favorable appearance of the vehicle can be ensured, and the washing device 101 can be protected from damage when the washing device 101 is not in use. In addition, when the washing device 101 is not in use, the piston 104 is pulled inside the cylinder 103, and the washing device 101 is housed inside the vehicle body. Accordingly, the washing device can be miniaturized.

Figure 12:
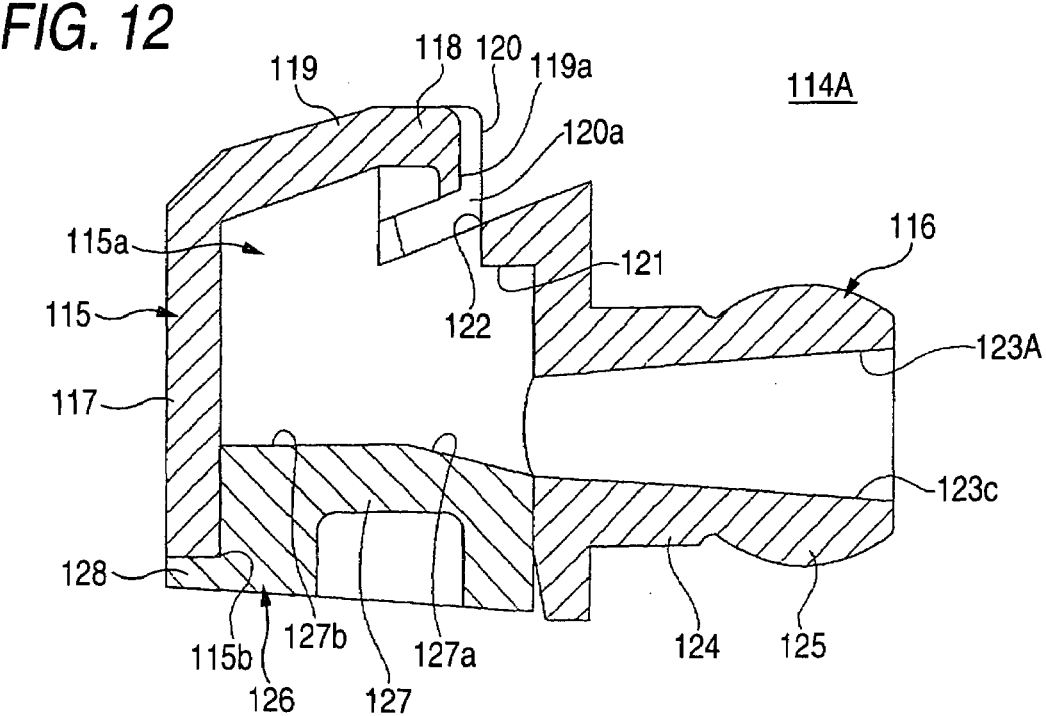
FIG. 12 is an enlarged cross-sectional view showing another spray nozzle with a cap member is attached thereto.

In the above, an example has been described in which the spray nozzle 114 is formed, except for a portion of the supply passage 123, as the reduction section 123a. However, in the fourth embodiment which is shown in FIG. 12, a spray nozzle 114A in which an entire supply passage 123A is formed as a reduction section 123c whose diameter decreases in size in a direction toward the space 115a may be employed in place of the spray nozzle 114.

When the spray nozzle 114A is employed, the length of the reduction section 123c can be increased. Therefore, functionality of rectification function can be enhanced.

Specific shapes and structures of the respective sections described in the above-mentioned best mode indicate only an example of embodiments of the present invention; and it is to be understood that the technical scope of the invention is not limited thereto.

Figure 13:
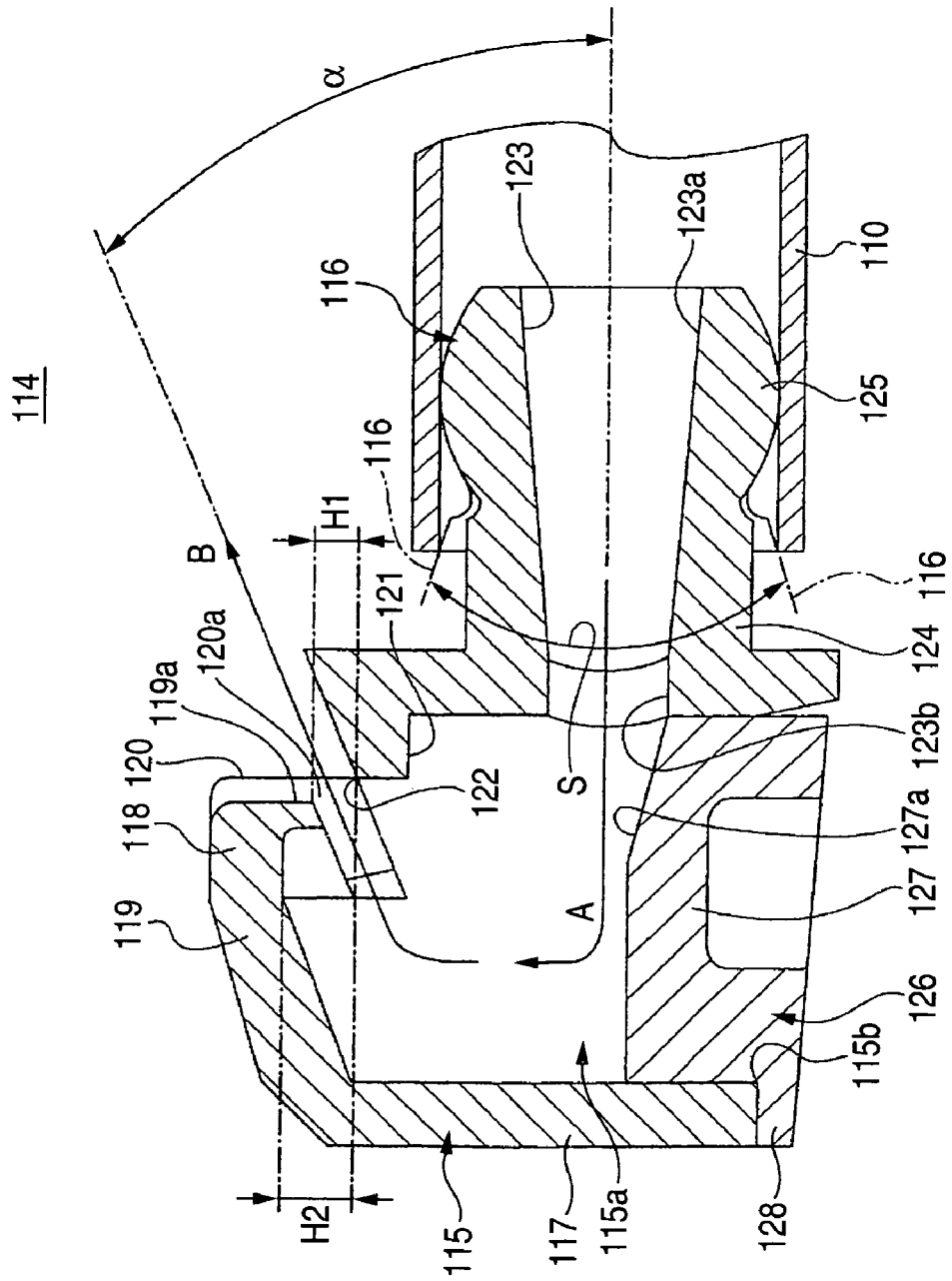
FIG. 13 is an enlarged cross-sectional view showing the spray nozzle with a cap member is attached thereto.

Meanwhile, in the fifth embodiment which is described in FIG. 13, The cleaning water supplied from the supply passage 123 to the space 115a of the head section 115 is changed such that the flow direction is turned by a substantially right angle when the cleaning water is guided from the supply passage 123 to the space 115a (arrow A shown in FIG. 13). In addition, at this time, the cleaning water flows along the control face 127a of the cap member 126 as described above.

The cleaning water supplied to the space 115a is sprayed in the direction toward an opening of the spray orifice 122 of the spray nozzle 114; that is, upwardly rearward from the spray orifice 122 toward the surface of the lens cover 102 of the vehicle headlamp 100 (arrow B shown in FIG. 13). Therefore, a direction in which the cleaning water sprayed from the spray orifice 122 is substantially rearward in relation to the flow direction through the supply passage 123, and the two directions form an acute angle α (see FIG. 13).

Immediately before the cleaning water is sprayed from the spray orifice 122, flow is changed by means of the upright wall 119a disposed in the spray section 118, whereby turbulent flow is generated. Therefore, the cleaning water is sprayed from the spray orifice 122 in a state of being spread to a predetermined degree. Accordingly, since the cleaning water is sprayed against the lens cover 102 in a state of being spread to a predetermined degree, washing efficiency can be enhanced.

When the cleaning water is sprayed from the spray orifice 122, the restriction sections 120a, 120a formed on the side walls 120, 120 of the spray section 118 prevent the cleaning water from being spread wider than required. Therefore, spraying of the cleaning water toward unnecessary portions other than the lens cover 102 can be prevented, along with reduction of washing ability possibly caused by excessive spread of the spray range.

When supply of the cleaning water from the cleaning water tank to the cylinder 103 is stopped, the check valve 112 is moved downward and closed by a restoration force of the coned disc spring 113 in response to a drop in hydraulic pressure. When the hydraulic pressure drops further, the piston 104 is pulled inside the cylinder 103 by a restoration force of the helical tension spring 107. Along with this, the spray nozzle 114, the water-supply unit 108, and the cover unit 111 are returned to their original positions assumed before washing.

As described above, in the washing device 101, the spray nozzle 114 is integrally formed with the head section 115 and the supply section 116; and cleaning water supplied from the supply passage 123 of the supply section 116 is sprayed from the spray orifice 122 in a direction forming an acute angle with a flow direction of the cleaning water through the supply passage 123. Consequently, the flow direction of the cleaning water is changed in the spray nozzle 114.

Therefore, a nozzle holder which has been required in a conventional washing device for holding the spray nozzle is not needed. Accordingly, the washing device 101 can be reduced in height by an amount corresponding to the height of the nozzle holder, whereby the washing device 101 can be reduced in profile.

Particularly, the above configuration is extremely advantageous for a case where reduction in height is required of the washing device 101 from a constraint in view of design of appearance of a vehicle headlamp.

In addition, as described above, the washing device 101 protrudes outside of the vehicle body when the washing device 101 is in use, and is housed inside the vehicle body when the washing device 101 is not in use. Accordingly, since the washing device 101 protrudes only in the case of necessity, favorable appearance of the vehicle can be ensured when the washing device 101 is not in use, and the washing device 101 can be protected from damage. In addition, when the washing device 101 is not in use, the piston 104 is pulled inside the cylinder 103 and the washing device 101 is housed inside the vehicle body. Accordingly, the washing device 101 can be miniaturized.

Specific shapes and structures of the respective sections described in the above-mentioned best mode indicate only an example of embodiments of the present invention; and it is to be understood that the technical scope of the invention is not limited thereto.

It will be apparent to those skilled in the art that various embodiments and variations can be made to the described preferred embodiments of the present invention without departing from the spirit or scope of the invention. Thus, it is intended that the present invention cover all embodiments and variations of this invention consistent with the scope of the appended claims and their equivalents.

What is claimed is:

1. A vehicle lamp washing device comprising:
    a spray nozzle having a supported section, and a spray section for spraying cleaning water;
    a nozzle holder into which the supported section of the spray nozzle is inserted to support the spray nozzle so that the spray nozzle can be rotated about an imaginary axis extending in an insertion direction of inserting the spray nozzle; and
    a water-supply unit which has a fluid passage for supplying cleaning water to the spray nozzle, and which is connected to the nozzle holder; and
    when the imaginary axis extending in the insertion direction of the spray nozzle in relation to the nozzle holder is taken as a first imaginary axis, the nozzle holder is supported by the water-supply unit so as to be rotatable about a second imaginary axis whose axial direction differs from that of the first imaginary axis;
    wherein a collar portion is formed integrally with the nozzle holder so as to fit inside of the supported section of the spray nozzle, said collar portion rectifying a cleaning water that is supplied from the nozzle holder to the spray nozzle.

2. The vehicle lamp washing device according to claim 1, wherein
    the supported section of the spray nozzle is formed substantially in a cylindrical shape extending in said insertion direction.

3. The vehicle lamp washing device according to claim 1, wherein
    the water-supply unit is connected to a cylinder for pumping cleaning water, and the connecting direction between the nozzle holder and the water-supply unit is tilted by a predetermined angle in relation to a direction in which the cleaning water is pumped through the cylinder.

4. The vehicle lamp washing device according to claim 1, wherein
    a water-supply pipe to be connected to the nozzle holder is provided in the water-supply unit;
    an opening for supplying cleaning water to the spray nozzle is formed in the washing-water-supply pipe; and
    the nozzle holder is connected to the opening.

5. The vehicle lamp washing device according to claim 1, wherein the vehicle lamp washing device protrudes outside of a vehicle body when the washing device washes the vehicle lamp, and is housed inside the vehicle body when the washing device is not in use.

6. A vehicle lamp washing device comprising:

a spray nozzle having a supported section, and a spray section for spraying cleaning water;

a nozzle holder into which the supported section of the spray nozzle is inserted to support the spray nozzle so that the spray nozzle can be rotated about an imaginary axis extending in an insertion direction of inserting the spray nozzle; and a water-supply unit which has a fluid passage for supplying cleaning water to the spray nozzle, and which is connected to the nozzle holder; and when the imaginary axis extending in the insertion direction of the spray nozzle in relation to the nozzle holder is taken as a first imaginary axis, the nozzle holder is supported by the water-supply unit so as to be rotatable about a second imaginary axis whose axial direction differs from that of the first imaginary axis;

wherein said supported section of the spray nozzle is formed substantially in a cylindrical shape extending in the first imaginary axis direction with a plurality of notches being formed in a circumferential direction at a lower end thereof.

7. The vehicle lamp washing device according to claim 6, wherein the water-supply unit is connected to a cylinder for pumping cleaning water, and the connecting direction between the nozzle holder and the water-supply unit is tilted by a predetermined angle in relation to a direction in which the cleaning water is pumped through the cylinder.

8. The vehicle lamp washing device according to claim 6, wherein a water-supply pipe to be connected to the nozzle holder is provided in the water-supply unit;

an opening for supplying cleaning water to the spray nozzle is formed in the washing-water-supply pipe; and the nozzle holder is connected to the opening.

9. The vehicle lamp washing device according to claim 6, wherein the vehicle lamp washing device protrudes outside of a vehicle body when the washing device washes the vehicle lamp, and is housed inside the vehicle body when the washing device is not in use.

* * * * *